(12) United States Patent
Schultz et al.

(10) Patent No.: US 9,328,836 B2
(45) Date of Patent: May 3, 2016

(54) PRESSURE REGULATOR VALVE SEALS, SYSTEMS AND METHODS

(75) Inventors: Jeffrey A. Schultz, Pittsville, VA (US); Benjamin R. Rieley, Rustburg, VA (US)

(73) Assignee: Schrader Electronics Ltd., Antrim, Northern Ireland (GB)

( * ) Notice: Subject to any disclaimer, the term of this patent is extended or adjusted under 35 U.S.C. 154(b) by 1145 days.

(21) Appl. No.: 12/590,696

(22) Filed: Nov. 12, 2009

(65) Prior Publication Data
US 2011/0108130 A1    May 12, 2011

(51) Int. Cl.
*F16K 15/02* (2006.01)
*F16K 17/06* (2006.01)
*F02M 37/00* (2006.01)

(52) U.S. Cl.
CPC ............ *F16K 17/06* (2013.01); *F02M 37/0029* (2013.01); *Y10T 137/0396* (2015.04)

(58) Field of Classification Search
CPC ............ F02M 37/0029; F16K 17/0466; Y10T 137/0396
USPC ............ 137/537, 538, 536, 12; 251/332, 368, 251/359
See application file for complete search history.

(56) References Cited

U.S. PATENT DOCUMENTS

| | | | |
|---|---|---|---|
| 2,820,474 A * | 1/1958 | Greenwood et al. | 137/538 |
| 3,438,391 A * | 4/1969 | Yocum | 137/516.29 |
| 5,113,900 A | 5/1992 | Gilbert | 137/515.5 |
| 6,068,022 A * | 5/2000 | Schultz et al. | 137/538 |
| 6,311,716 B1 * | 11/2001 | Jones | 137/118.02 |
| 7,059,582 B2 * | 6/2006 | Adams et al. | 251/144 |
| 2003/0066978 A1 * | 4/2003 | Enerson | 251/86 |
| 2003/0217770 A1 * | 11/2003 | Schultz et al. | 137/73 |

FOREIGN PATENT DOCUMENTS

| | | |
|---|---|---|
| DE | 19913805 A1 | 4/2000 |
| DE | 10148960 A1 | 4/2002 |
| GB | 1371514 A | 10/1974 |
| JP | 1989-122567 | 8/1989 |
| JP | 2000-028010 | 1/2000 |
| WO | 2006052110 A1 | 5/2006 |

OTHER PUBLICATIONS

Korean Office Action for Application No. KR 10-2012-7015055, dated May 26, 2015, from the Korean Intellectual Property Office.

* cited by examiner

*Primary Examiner* — Kevin Lee
*Assistant Examiner* — P. Macade Nichols
(74) *Attorney, Agent, or Firm* — Holland & Hart LLP

(57) ABSTRACT

A pressure regulator valve has a housing that defines a fluid passage and a flat seat disposed around an opening of the fluid passage and exit ports. A pin with a raised conforming elastomeric embossment that contacts the seat when the valve is closed is axially disposed in the housing. The pin is biased to maintain the elastomeric embossment in contact with the seat to maintain the valve closed and control an opening pressure of the valve. Flow of fluid through and out of the pressure regulator valve housing is controlled through adjustment of a level of this biasing. The fluid flows across the flat seat and between the flat seat and the embossment when the valve is open in such a manner that the flow is generally laminar and such that the valve minimizes pressure gain at the onset of flow.

25 Claims, 3 Drawing Sheets

PRESSURE REGULATOR VALVE SEALS, SYSTEMS AND METHODS

BACKGROUND OF THE INVENTION

1. Field of the Invention

This invention relates generally to pressure relief and pressure regulating valves, and more particularly to valve seals that minimize pressure gain with increasing flow in pressure regulator valves and the like, specifically well suited for use in fuel injection and other systems where minimizing pressure increases with increasing flow is desirable for improved system performance.

2. Description of the Prior Art

Internal combustion fuel injection systems typically require some form of pressure controlling device, either a pressure regulator or a pressure relief valve to maintain an appropriate fuel pressure at the injectors. Conventional fuel pressure relief valves and regulators utilize metal-to-metal seals in the pressure relief valve. The metal-to-metal sealing elements are resistive to surface depression of the adjacent sealing surfaces; resulting in a direct flow path with minimum pressure drop. However, the metal-to-metal seals are subject to high leakage rates as the two sealing surfaces are rigid, nonconforming and highly sensitive to the effects of contamination. One solution to this problem employs rubber sealing pressure regulator valves. Such fuel pressure regulator valves comprise a rubber sealing element which is held in intimate contact with a metal seat, the seat having a raised boss that contacts, and depresses into the surface of a planar rubber element. In such a traditional valve design the annular metal sealing surface contacts the relatively thick flat rubber pad to affect the valve seal. Because of the relative softness, and viscoelastic properties, of the rubber the metal ring causes a permanent indention into the rubber surface. This surface depression typically causes a permanent "compression set" in the rubber. As the valve begins to open, the fluid flow is constrained to conform to the complex channel defined by surface deformation in the rubber, which results in a labyrinth flow path as the pressure regulator valve begins to open. The long and convoluted flow path causes a significant pressure drop at initial valve opening.

Metal-to-metal sealed devices are more expensive and have a higher leak rate than rubber sealing pressure regulator valves. Leakage is typically associated with increased difficulty starting the associated vehicle. However, conventional rubber sealing pressure relief valves and regulators have a greater pressure drop, and less linear flow characteristics. These liabilities limit the application of rubber sealing pressure regulator valves.

SUMMARY

The present invention is directed to systems and methods which minimize the pressure drop in a pressure regulator valve during low flow conditions.

The present invention reverses the arrangement of sealing elements in a rubber sealing pressure regulator valve, creating a raised boss in the rubber component that in contact with a planar metal seat. The metal seat, being resistant to "compression set", maintains its planar surface allowing a direct flow path that minimizes pressure drop of the flowing fuel.

The present invention reduces the leakage of the pressure regulator valve when it is closed, compared to the conventional metal-to-metal pressure regulator valve seal. This reduced leakage is advantageous to the fuel injection system's ability to hold pressure while the vehicle is off.

Thus, in accordance with various embodiments of the present invention a pressure regulator valve, such as a fuel pressure regulator valve, has a housing that defines a fluid passage and a flat seat disposed around an opening of the fluid passage. The housing also preferably has exit ports. A pin is preferably axially disposed in the housing. This pin preferably has a raised conforming elastomeric embossment that contacts the seat when the valve is closed. For example the pin might have a raised annulus over which the elastomeric embossment is molded. This elastomeric overmold may have a thickness in a range of about 0.002 inches to about 0.020 inches in thickness, preferably about 0.007 inches in thickness. The elastomer may be a fluoroelastomer, a nitrile, or the like selected for its chemical stability when exposed to the fluid used in the system. The pin is preferably biased, such as through exertion of compressive spring force on the pin, to maintain the elastomer embossment in contact with the seat to maintain the valve closed and control an opening pressure of the valve. This biasing is preferably adjustable and may be provided by a spring disposed in the housing, in contact with the pin and an adjustment screw disposed in the housing to contact and adjust the biasing of the spring. The spring may be a coil spring, an elastomeric spring, cantilever spring arrangement, a conical spring or other similar biasing member.

In operation, such embodiments of a pressure regulator valve provide a flow channel, with the flat seat defined around the flow channel. The raised conforming elastomeric embossment defined on the pin, such as by overmolding the annulus defined by the pin with an elastomeric material, is axially contained in the housing. The pin is preferably biased such that the embossment is in contact with the seat when the valve is closed and flow of fluid through and out of the pressure regulator valve housing is controlled through a level of the biasing. The fluid flows across the flat seat and between the flat seat and the embossment when the valve is open in such a manner that the flow is generally linear with streamlined flow characteristics.

In accordance with embodiments of the present pressure regulator valve, a hydraulic mechanism or electrically actuated mechanism may be used to apply the biasing at a level directed by automatic or programmed logic. Similarly, in accordance with some embodiments, a hydraulic or electrically actuated mechanism might be employed to varying the tension in a biasing spring or the like according to automatic or programmed logic.

With respect to pressure drop to flow, the present invention provides the fuel injection system, or the like in which it is deployed, a lower pressure drop as the pressure regulator valve actuates and a more linear pressure drop-versus-flow relationship across the span of fluid flow rates through which the pressure regulator valve operates. The reduced pressure drop improves the robustness of the fuel injector performance, as the fuel injectors are exposed to lower pressure excursions. This linear relationship improves the effectiveness of the fuel injection control system by increasing the predictability of the pressure drop.

The reduced pressure drop provided by the present valve results in several advantages. First, the reduced pressure drop is itself an advantage. Secondly, since the flow path remains fundamentally unchanged as the flow is increased, the rate of change in pressure drop with flow is constant, improving the linearity of the flow-to-pressure drop relationship. And lastly, the pressure drop does not vary as the properties of the rubber change, either over time, as the valve ages, or between individual valves.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
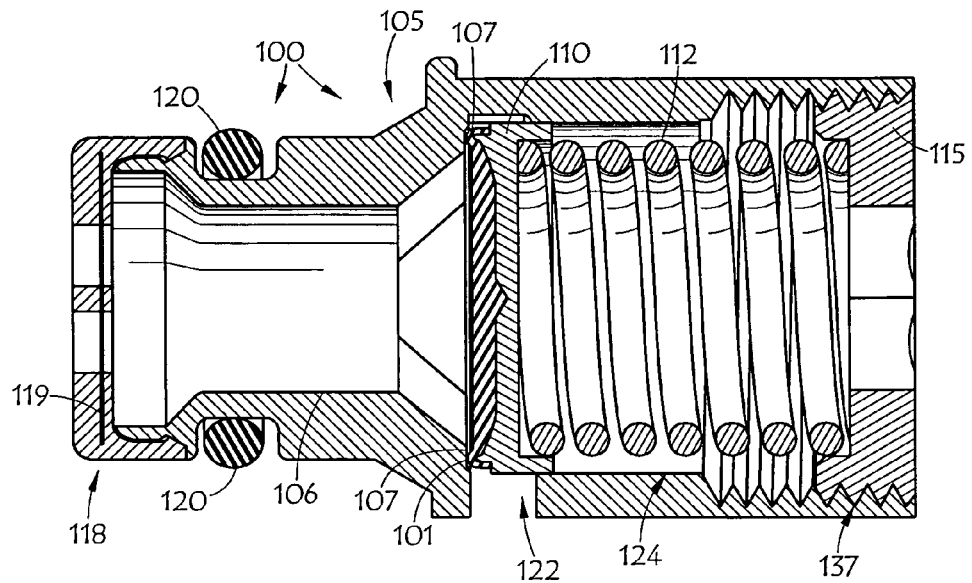
FIG. 1 is a partially fragmented, generally cross-sectional view of an embodiment of a pressure regulator valve employing a seal in accordance with the present invention.

FIG. 1 is a partially fragmented, generally cross-sectional view of an embodiment of pressure regulator valve 100 employing seal 101 in accordance with the present invention. Fuel pressure regulator valve 100 is primarily comprised of housing 105 defining fuel passage 106 and seat 107. Pin 110 is disposed in housing 105. Pin 110 has raised conforming elastomeric embossment 101 that functions as a seal that contacts seat 107 when valve 100 is closed. Spring 112, disposed in the housing, biases pin 110 to maintain rubber embossment 101 in contact with seat 107 to maintain valve 100 closed until fuel pressure on the opposite side of pin 110, such as in fluid passage 106, overcomes tension in spring 112. Adjusting screw 115, or a similar mechanism, which may be disposed in housing 105, is used to adjust the biasing provided by spring 112. The embodiment shown in FIG. 1 also employs inlet filter 118, which may be a nylon mesh screen 119, held in a nylon plastic housing, snapped onto valve housing 105. Such a filter screen typically has a mesh opening of between twenty and fifty microns. O-ring 120 may be fit onto housing 105 to provide a seal between the valve and it's mounting, which may be a fuel pump body or other fuel system structure, either in the fuel tank or elsewhere in the fuel system. The o-ring may typically be made from Fluoroelastomer (FKM) rubber, but any rubber that is compatible with the fuel being handled may be used.

Housing body 105 preferably provides a flow path, between filter 118 and seal 101, such as fuel passage 106, and from seal 101 through flow discharge ports 122. Housing bore 124, above seal 101, operatively accommodates valve pin 110 and constrains the length of valve spring 112. Preferably, pin 100 is contained axially in bore 124 of body 105. Housing 105 defines seal seat 107, which interfaces with seal 101 of pin 110. Housing 105 may be made of brass, optionally plated with nickel, or the like. However, most any non-corrosive metal, or other metal with an anti-corrosive coating, can be employed for housing 105. Alternatively, plastic construction, using moisture and fuel resistant plastics may be used.

Figure 2:
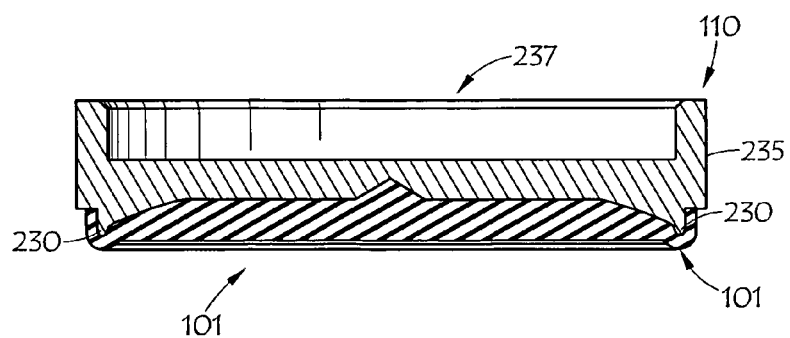
FIG. 2 is an enlarged, more detailed, partially fragmented, generally cross-sectional, view of an embodiment of a pin for use in accordance with the present invention.

FIG. 2 is an enlarged, more detailed, partially fragmented, generally cross-sectional, view of an embodiment of generally cylindrical pin 110, showing rubber seal 101 overmolded onto sealing annulus 230. Overmolded seal 101 may extend beyond annulus 230 and onto the bottom of flange 235. Flange 235 may align pin 110 in bore 124. Pin 110 also preferably defines recess 237, which may be generally circular, for mating with, and aligning pin 110 with, spring 112. Alternatively, pin 110 might define a boss or other structure protruding from pin 110 to mate with spring 112 and align it with pin 110. The relative thinness of overmolded rubber seal 101 over sealing annulus 230, and provides repeatable and durable performance in the present valve. A relative shallow depth for annulus 230 may further facilitate this performance repeatability and durability. Preferably, the thickness of seal 101, over annulus 230 is sufficiently thin to limit the total distention of the shape of seal 101 and any rubber swelling. Preferably the shape of seal 101 is maintained by the underlying reinforcing metal of annulus 230.

Pin 110 may be nickel plated brass, although it may be made from any metal, with appropriate anti-corrosive properties or coating. Alternatively pin 110 may be made from plastic. Seal 101 may made from FKM, but other rubber compounds suitable for use with the fuel being handled may be used.

Returning to FIG. 1, spring 112 is held in compression between the top of pin 110 and adjusting screw 115. The spring may be stainless steel, but other spring materials that have suitable corrosion resistant properties with respect to the fuel being handled may be used. Furthermore, the spring may be a coil spring, as illustrated in FIG. 1, but it might also be an elastomeric structure of some sort or a cantilevered or conical spring. Valve opening pressure is calibrated by adjusting the axial position of screw 115 in threads 137 defined in body 105 until a correct spring force is applied to pin 110 to balance a desired fluid pressure below seal 101, providing a correct opening pressure for valve 100, after which screw 103 is locked in position. In the embodiment shown in FIG. 1, an upsetting tool or the like may be used to lock the threads between housing 105 and adjusting screw 115. However, other arrangements, such as a mechanical lock or adjustable pin, may be used. The adjusting screw may be made of brass, with a nickel coating. However, most any non-corrosive metal or other metal with an anti-corrosive coating or plating could be used to make screw 115. Also, a plastic construction, using moisture and fuel resistant plastics may be used. Other means of providing the adjustment rather than threads may also be used, as appropriate to the materials of construction and the assembly process.

Figure 3:
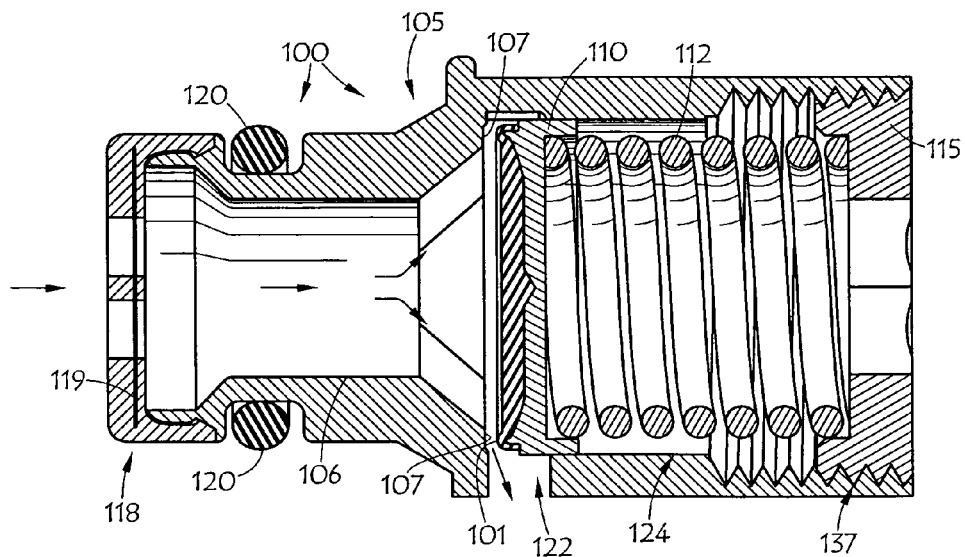
FIG. 3 is a partially fragmented, generally cross-sectional view of the pressure regulator valve embodiment of FIG. 1, showing the valve open, with resulting linear streamlined flow.

With attention directed to FIG. 3, the arrangement of components in the present valve provides a substantially different flow path in contrast to the prior art. FIG. 3 shows valve 100 open, with resulting linear streamlined flow, as indicated by flow arrows. In the present arrangement the metal surface of seat 117, defined by the housing, is flat and the raised annular ring is preferably formed by a thin layer of rubber 101 molded over a metal reinforcing embossment 230, or the like. In such embodiments displacement or swelling that occurs in the rubber, over time does not change the flow path in the valve. Preferably a thin section thickness for the rubber embossment limits the total distention of the shape, which is maintained by the underlying reinforcing metal. As the valve begins to open the fluid flow will be straight, parallel to the metal surface of the housings seat, without any changes in direction or constraint through a contorted path. The result is lower pressure drop at the onset of flow.

With respect to pressure drop to flow, the present invention provides a fuel injection system a lower pressure drop as the pressure regulator valve actuates and a more linear pressure drop-versus-flow relationship across the span of fluid flow rates through which the pressure regulator valve operates. The reduced pressure drop improves the robustness of the fuel injector performance, as the fuel injectors are exposed to lower pressure excursions. This linear relationship improves the effectiveness of the fuel injection control system by increasing the predictability of the pressure drop.

Figure 4:
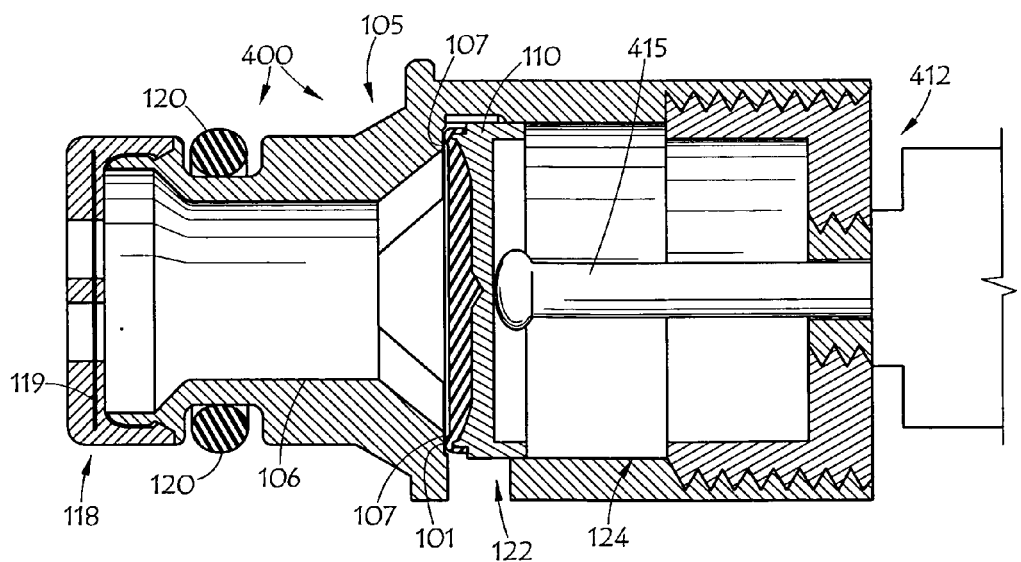
FIG. 4 is a partially fragmented, generally cross-sectional view of a regulator valve embodiment of the present invention employing an example of hydraulically actuated biasing mechanism.
Figure 5:
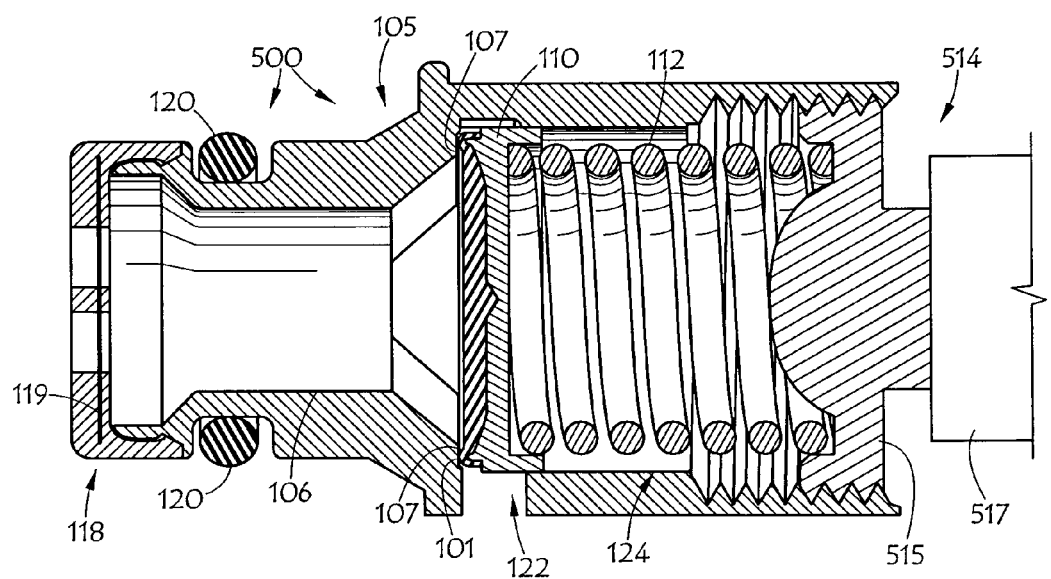
FIG. 5 is a partially fragmented, generally cross-sectional view of a regulator valve embodiment of the present invention employing an example of an electronically actuated bias adjustment mechanism.

In certain embodiments of a pressure regulator valve, biasing force may, as diagrammatically depicted in FIG. 4, be applied by a mechanism (412) other than a spring or the like, and/or may, such as diagrammatically illustrated in FIG. 5, be adjusted by a mechanism (514) other than a manually adjusted screw or the like.

For example, FIG. 4 shows a partially fragmented view of regulator valve embodiment 400 of the present invention employing example 412 of a hydraulically actuated biasing mechanism. Illustrated hydraulically actuated biasing mechanism 412 might be locally controlled such as by a locally (or remotely) located hydraulic (or pneumatic) valve supplying fluidic pressure to mechanism 412. This control valve might, in turn, be controlled by a vehicle Engine Control Module (ECM), or the like, in a fuel injection system, or by a similar control mechanism in other systems employing valve 400. Mechanism 412, which might take the form of a hydraulic (slave) cylinder, or the like, might bias pin 110, via push rod 415, to maintain rubber embossment 101 in contact with seat 107 to maintain valve 400 closed until fuel pressure on the opposite side of pin 110 overcomes the pressure exerted by cylinder 412. Alternatively, a hydraulic or pneumatic mechanism similar to mechanism 412, may be used to adjust the tension of a spring (112) in other embodiments of a pressure regulator valve (rather than replace it).

As another example, FIG. 5 shows a partially fragmented view of regulator valve embodiment 500 of the present invention employing example 515 of an electronically actuated bias adjustment mechanism. In valve 500 the biasing force exerted by spring 112 is adjusted or regulated by an electrical stepper motor, or the like, generally illustrated as 517 in FIG. 5. In the illustrated example, stepper motor 517 might turn screw pintle 515 to adjust the tension in spring 112 and in turn the biasing spring 112 imparts to pin 110 to maintain rubber embossment 101 in contact with seat 107 and to maintain valve 100 closed until fuel pressure on the opposite side of pin 110 overcomes the tension imparted in spring 112. Alternatively, an electrical solenoid, or the like, might be used to adjust bias in spring 112, rather than a stepper motor and pintle arrangement, as illustrated.

These or other mechanisms for applying hydraulic pressure may be interchangeably used to bias pin 110 and/or to adjust the biasing force applied to pin 110 with these or other electronic mechanisms. Regardless, such embodiments can provide variation of biasing force in accordance with an automatic or programmed logic, such as might be used in a fuel injection system to provide an added, higher degree of engine control for environmental, emissions or power optimization.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A pressure regulator valve comprising:
   a housing defining a fluid passage and a flat seat disposed around an opening of said fluid passage, within said housing, said housing further comprising exit ports;
   a pin disposed axially in said housing, said pin comprising a raised annulus extending around a periphery thereof having a radius that equals or exceeds an innermost radius of the flat seat;
   a conforming elastomeric embossment disposed over said raised annulus, wherein said conforming elastomeric embossment contacts said flat seat when said valve is closed;
   a biasing member coupled with said pin and configured to maintain said conforming elastomeric embossment in contact with said flat seat to maintain said valve closed and control an opening pressure of said valve; and
   an adjusting member coupled with said biasing member.

2. The pressure regulator valve of claim 1, wherein said conforming elastomeric embossment disposed over said raised annulus is in a range of about 0.002 inches in thickness to about 0.020 inches in thickness.

3. The pressure regulator valve of claim 1, wherein said conforming elastomeric embossment disposed over said raised annulus is about 0.007 inches in thickness.

4. The pressure regulator valve of claim 1, wherein said conforming elastomeric embossment is made of a fluoroelastomer.

5. The pressure regulator valve of claim 1, wherein said conforming elastomeric embossment is made of a nitrile.

6. The pressure regulator valve of claim 1, wherein said biasing member comprises a spring disposed in said housing.

7. The pressure regulator valve of claim 6, wherein said spring is a coil spring.

8. The pressure regulator valve of claim 1, wherein said means for biasing comprises hydraulic means for varying said biasing according to automatic or programmed logic.

9. The pressure regulator valve of claim 1, wherein said means for biasing comprises electrically actuated means for varying said biasing according to automatic or programmed logic.

10. The pressure regulator valve of claim 1, wherein said adjusting member comprises an adjustment screw disposed in said housing in contact with said biasing member.

11. The pressure regulator valve of claim 1, wherein said means for adjusting comprises hydraulic means for varying said biasing according to automatic or programmed logic.

12. The pressure regulator valve of claim 1, wherein said means for adjusting comprises electrically actuated means for varying said biasing according to automatic or programmed logic.

13. The pressure regulator valve of claim 1, wherein said pressure regulator valve is a fuel pressure regulator valve.

14. A method comprising:
providing a flow channel in a pressure regulator valve housing;
providing exit ports in said housing;
defining a flat seat in said housing, around said flow channel;
defining a raised annulus on a pin that extends around a periphery thereof and has a radius that equals or exceeds an innermost radius of the flat seat;
defining a conforming elastomeric embossment over said raised annulus on said pin;
containing said pin axially in said housing;
biasing said pin such that said conforming elastomeric embossment is in contact with said flat seat, when said valve is closed; and
controlling a flow of a fluid through and out of said pressure regulator valve housing based on a level of said biasing, said fluid flowing across said flat seat and between said flat seat and said conforming elastomeric embossment when said valve is open.

15. The method of claim 14, wherein said conforming elastomeric embossment is in a range of 0.002 inches in thickness to about 0.020 inches in thickness.

16. The method of claim 14, wherein said conforming elastomeric embossment is about 0.07 inches in thickness.

17. The method of claim 14, wherein said conforming elastomeric embossment is made of a fluoroelastomer.

18. The method of claim 14, wherein said conforming elastomeric embossment is made of a nitrile.

19. The method of claim 14, wherein said controlling comprises varying said level of biasing according to automatic or programmed logic.

20. A pressure regulator valve seal comprising an elastomer disposed over a raised annulus of a pressure regulator valve pin longitudinally disposed in a housing defining a fluid passage and biased to maintain said pressure regulator valve seal in contact with a flat seat disposed around an opening of said fluid passage, wherein the raised annulus extends around a periphery of the valve pin and has a radius that equals or exceeds an innermost radius of the flat seat, and wherein the housing comprises exit ports.

21. The pressure regulator valve seal of claim 20, wherein said elastomer is in a range of about 0.002 inches in thickness to about 0.020 inches in thickness.

22. The pressure regulator valve seal of claim 20, wherein said elastomer is about 0.007 inches in thickness.

23. The pressure regulator valve seal of claim 20, wherein said elastomer is a fluoroelastomer.

24. The pressure regulator valve seal of claim 20, wherein said elastomer is a nitrile.

25. The pressure regulator valve seal of claim 20, wherein said pressure regulator valve is a fuel pressure regulator valve.

* * * * *